United States Patent [19]
Hart

[11] Patent Number: 4,476,635
[45] Date of Patent: Oct. 16, 1984

[54] METHOD OF DETERMINING LENGTH OF A CONDUIT HAVING ENDS AT DIFFERENT ELEVATIONS

[76] Inventor: George V. Hart, 9846 Sagedowne La., Houston, Tex. 77089

[21] Appl. No.: 352,466

[22] Filed: Feb. 25, 1982

[51] Int. Cl.³ .............................................. G01B 3/10
[52] U.S. Cl. ...................................... 33/228; 33/138; 33/174 N; 33/342; 33/347; 33/DIG. 1
[58] Field of Search ................. 33/342, 343, 339, 347, 33/DIG. 1, 138 R, 340, 174 N, 228

[56] References Cited

U.S. PATENT DOCUMENTS

| | | | |
|---|---|---|---|
| 1,242,740 | 10/1917 | Taylor | 33/340 |
| 2,683,933 | 7/1954 | Mac Farland | 33/138 |
| 2,816,369 | 12/1957 | Becker | 33/138 |
| 2,942,348 | 6/1960 | Caruso | 33/342 |
| 3,021,599 | 2/1962 | Odom | 33/138 |
| 3,036,791 | 5/1962 | Siggelkow | 33/347 |
| 3,499,225 | 3/1970 | Darrah | 33/347 |
| 3,568,319 | 3/1971 | Moll | 33/340 |

FOREIGN PATENT DOCUMENTS 830573  2/1952  Fed. Rep. of Germany ........ 33/138

Primary Examiner—William D. Martin, Jr.
Attorney, Agent, or Firm—Bernard A. Reiter

[57] ABSTRACT

A gravitational protractor and measuring tape for determining the distance between respective conduit ends residing at differential elevations.

4 Claims, 6 Drawing Figures

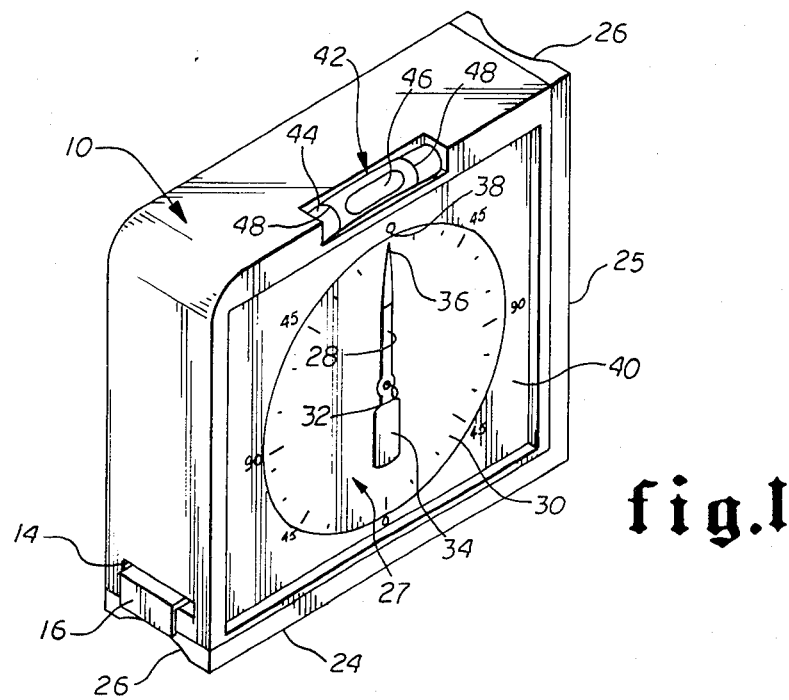

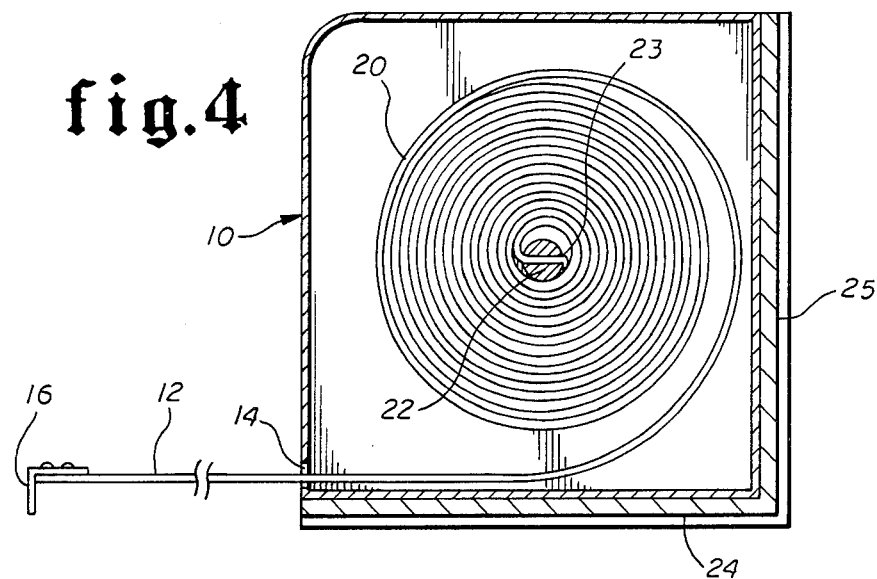
fig.4
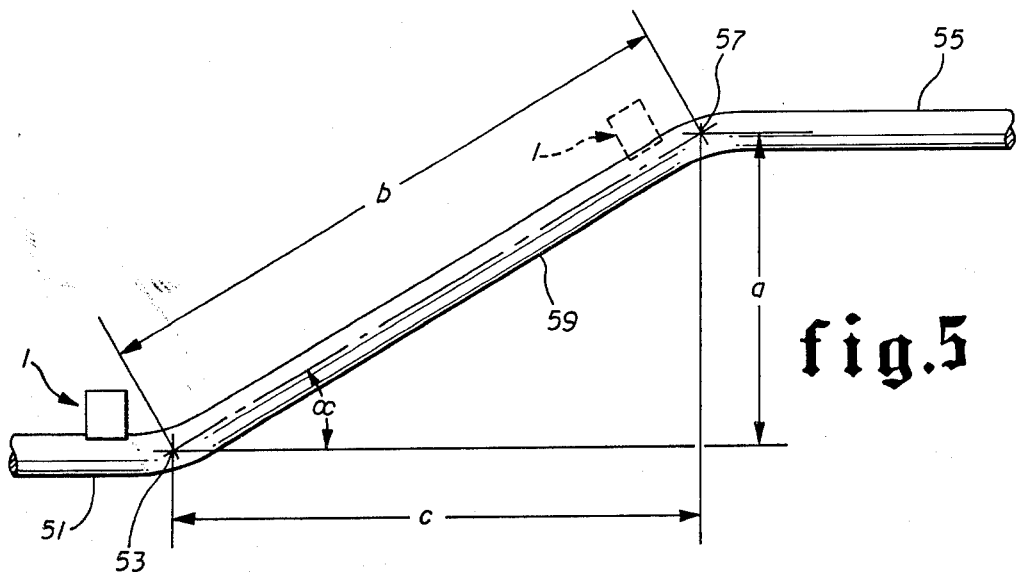
fig.5
| COS α | 1 | 2 | 3 | 4 | 5 | 6 | 7 | 8 | 9 | 10 |
|---|---|---|---|---|---|---|---|---|---|---|
| 10 | | | | | | | | | | |
| 15 | | | | | | | | | | |
| 20 | | | | | | | | | | |
| 25 | | | | | | | | | | |
| 30 | | | | | | | | | | |
| 35 | | | | | | | | | | |
| 40 | | | | | | | | | | |
| 45 | | | | | | | | | | 14.1 |
| 50 | | | | | | | | | | |
| 55 | | | | | | | | | | |
fig.6

METHOD OF DETERMINING LENGTH OF A CONDUIT HAVING ENDS AT DIFFERENT ELEVATIONS

BACKGROUND OF THE INVENTION

This invention relates generally to hand tools, and more particularly concerns a combination measuring tape case and gravitational protractor for use in installing tubular conduit and others similar applications.

Tubular electrical conduit is commonly used in construction of new buildings and otherwise to protect electrical wires. Electrical conduit commonly comes in 10 foot semi-rigid lengths in various diameters. Frequently it is necessary to connect two conduit ends together although one end resides at a different level (ceiling) than the other end (floor). In such case, the two ends are connected by a conduit piece, the length of which cannot be readily measured. Heretofore, that piece has been fabricated to length by trial and error guesswork, and likewise, the angle of bend has been the product of trial and error guesswork. This practice can lead to an expensive waste of conduit, when the 10 foot lengths are bent and then cut to fit by the trial and error method. Increased labor time due to the fitting process also is incurred. In complicated installations, the waste can be as great as 20% of all conduit used.

This waste of materials and labor can be virtually eliminated by measuring and calculating the location and approximate angle of the conduit bends. However, heretofore there have been no tools available to the skilled laborer for this purpose or the measurements and/or calculations have been difficult.

BRIEF SUMMARY OF THE INVENTION

In accordance with the invention, a combination tool is provided which incorporates in one compact case a retractable tape measure and a gravitational protractor which, when set upon a horizontal surface for use, will indicate the angle of inclination of that surface with respect to the horizontal, and in use thereafter simplify length calculations. Also it will eliminate waste in the cutting and connecting of conduit ends existing at different elevations in preparation for connection. The use of the tool consists of number tables embodying trigonometric calculations which readily produce the proper answer for conduit length when preparatory measurements are taken by the user with the aid of the tool. The present tool may also be adapted to indicate the deviation of a surface from the vertical; and further incorporates magnets to removably attach it in facile manner to any ferromagnetic surface, thereby freeing both of the user's hands, while still permitting him to observe the inclination of that surface with reference to either the horizontal or the vertical. The tool of the invention may also include a linear concave shape, so that the magnets may more easily secure it to a steel or metal tube. Also, included is a spirit level to supplement the gravitational protractor and indicate whether a surface is horizontal or vertical to thus impart accuracy to the invention.

Therefore, it is an object and advantage of this invention to provide a combination measuring tape case and gravitational protractor. A further object and advantage of this invention is to provide a tool for use by electricians running tubular conduit on building and construction sites which will be convenient and easy to use. It is an additional object and feature of this invention to provide a single tool which will combine the functions of a number of existing devices, as described hereinafter. A still further feature resides in a compact and portable tool enabling significant savings in labor and materials when constructing conduit systems at different elevations. Yet another feature is a gravitational protractor enabling accurate elevated measurement for ease and accuracy of installing conduit systems in safe and efficient manner. A still further feature of the invention resides in a tool for use by skilled labor that is easy to use and facile to handle for accurate construction of conduit systems.

These and numerous other features and advantages of the invention will become more readily apparent upon a careful reading of the following detailed description, drawings and claims, wherein like numerals denote like parts in the several views and wherein:

BRIEF DESCRIPTION OF THE DRAWINGS

FIG. 1 is a perspective view of the present invention.

FIG. 2 is a view in side elevation of the present invention.

FIG. 3 is a sectional view in plan of the present invention.

FIG. 4 is a sectional view in side elevation of the present invention.

FIG. 5 is a schematic illustration showning an application for the invention.

FIG. 6 is an exemplary table showning, in precalculated manner, the method for finding a length of conduit.

While the invention will be described in connection with a preferred embodiment, it will be understood that it is not intended to limit the invention to that embodiment. On the contrary, it is intended to cover all alternatives, modifications and equivalents as may be included within the spirit and scope of the invention, as defined by the appended claims.

DETAILED DESCRIPTION OF THE INVENTION

Turning now to the drawings, and particularly to FIG. 4, there is shown the combination tool 1 of the invention comprising an enclosure 10 adapted to hold a coiled retractable measuring tape 12. The enclosure has an opening 14 for the passage of the measuring tape 12 in and out of the enclosure 10. The end of the measuring tape 12, which extends through the opening 14, is provided with an end hook 16 for grasping a surface in conventional fashion. The other end of the measuring tape 12 is connected to a coiled spring 20. The inner end of the spring 20 is normally secured to a post 22 by passing it through a slot 23 provided in the post.

Turning now to FIG. 2, the enclosure 10 is provided with a base 24 and a back 25, perpendicular to the base 24. Both the base 24 and the back 25 are preferably made of magnetic material. Both the base 24 and the back 25 also have a linearly concave shape as is best shown in FIG. 3 by surface 26.

Returning now to FIG. 2, a gravitational protractor 27 is attached to the enclosure 10. The gravitational protractor 27 includes an indicator 28 and a numbered angular scale 30. The indicator 28 is pivotally mounted to the enclosure 10 by a pivot 32. The indicator 28 has a weight 34 at one end and a pointed tip 36 at the opposite end. The numbered scale 30 is equiped with scale marks 38 adjacent to the pointed tip 36 of the indicator 28 so that the latter may come into registering relation to the former. The indicator 28 and the scale 30 are protected by a transparent cover 40.

The enclosure 10 may also have a spirit level 42. The spirit level 42 has a curved passage 44 filled with a liquid, except for a gas bubble 46. The spirit level 42 is mounted to the enclosure 10 and a pair of spaced parallel lines 48 are marked on the spirit level 42 so that when the gas bubble 46 is located between the pair of parallel lines 48, a surface in contact with the base 24 is horizontal, and/or a surface in contact with the back 25 is vertical.

In use, there is a surprising and highly advantageous benefit and advantage to the skilled laborer in applying the multi-component and multi-functional measuring tape of the invention for the purpose of determining the length of conduit necessary for coupling two conduit ends existing at different elevational levels. In this regard, reference is made to FIG. 5, wherein there is shown the electrical conduit 51, which normally exists in a residence or office building, having a terminating end 53. Similarly, there exists at a higher elevational level, such as in the ceiling, electrical conduit 55, having a terminating end 57. It is the object of the skilled laborer to couple the two ends 53, 57 with a piece of pre-cut conduit 59 (shown in ghost) because the elevational height A of pipe 57 may not be known, or readily achieved, it is not known how to cut the appropriate length for conduit coupling B. The installer, however, has ready access to information which enables determination of the appropriate length B for conduit 59, even though he is not able to measure from end 57 to end 53. This information manifests itself in the form of conventional trigonometric tables which, to the extent necessary, are translated to the rear face 57 of enclosure 10. Installer is advised to use the combination tool of the present invention in the following manner in order to accomplish determination of appropriate length for conduit 59 without waste of material and loss of time.

The combination tool 1 is placed at the terminating end 53 on conduit 51 and the retractable measuring tape 12 is withdrawn in order to take measurement of the distance C, a measurement which is achieved by visual alignment taken to a point directly below end 57 of conduit 55. Determination is then made that bubble 46 of tool 1 is resting reasonably between lines 48, so as to assure level positioning for visual estimation of angle $\alpha$. In the event that bubble 46 is not within the limits of lines 48, conduit end 53 is raised or lowered appropriately to accomplish the level condition. This is done with facility since conduit end 53 resides in cantilever state and is sufficiently flexible to be manipulated to reasonably horizontal position. In the event that horizontal position is not readily achievable, indicator 28 will show on the gravitational protractor 27 the angular position of the conduit when base 24 is resting on the surface of the conduit 51. Installer then visually ascertains angle $\alpha$ by citing from the position of tool 1 to the terminal point 57 of conduit 55, and records the visual estimate of this angle upon observation of the site line on protractor 27. It is found that this visual siting along the face of protractor 27 is sufficiently reliable to achieve the necessary angular information for trigonometric calculation. Thus, upon completion of these two reasonably simple measurements, there exists sufficient information to ascertain the distance B necessary to fabricate conduit 59. Since not all installers are versed in use of trigonometric functions, the aforementioned distance table 67 may be engraved or otherwise placed upon the rear face of enclosure 10. The rear face of enclosure 10 will provide the necessary information that has been previously calculated, such as for example with respect to the distance B, by taking the known information in the form of the adjacent side C and the estimated angle $\alpha$, thus providing the conventional formula for determining the length of side B, this in the form of B=C over Cosine $\alpha$. Thus, if the distance C is 10 feet, and angle $\alpha$ is estimated to be 45 degrees, it is known that B would equal 10 over 10.707, or equal to 14.1 feet. Thus, in all cases where the distance B necessary for fabrication of connecting conduit 59 is unknown, the installer need only to take measurement of the distance C, that is to a point directly beneath conduit end 57, and take visual siting of angle $\alpha$, so as to therefore simply observe on the back face 67 of tool 1 the necessary length of conduit to be fabricated.

In FIG. 6 there is shown for exemplary purposes, a form for the table aforementioned. Here it is shown that the installer need do no calculation and that simply cross-referencing from the abscissa (Cosine $\theta$) to the ordinate (distance C) enables facile achievement of conduit length B (14.1 feet).

By way of further explanation for use of the tool 1, it will be recognized that when the surface is ferromagnetic, the magnets in the bottom 24 or the back 25 will removably attach the enclosure 10 to that surface. If the ferromagnetic surface is tubular, like electrical conduit, the linear concavity 26 in the base 24 or the back 25 will both align the enclosure 10 with the axis of the tubular surface and aid the magnetic attachment to that surface, permitting the tubular surface to be moved as it would be during a bending operation while continuing to indicate the angular inclination of the surface. The spirit level permits more accurate leveling of a surface in contact with the bottom 24 or the back 25 of the enclosure 10.

Thus, it is apparent that there has been provided, in accordance with the invention, a combination measuring tape case and gravitational protractor that fully satisfies the object, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. The method for using a combination retractable measuring tape and protractor for determining the inclined distance from the position of the tool, which is resting at a first point to an elevated second point not readily reached by the user thereof in order that such user can accurately fabricate a structural component for bridging between said first and second points, comprising the steps of:

positioning the combination tool at said first point and ascertaining the horizontal posture thereof in order to facilitate accurate measurement of the angle of inclination to the second point;

withdrawing the measuring tape in horizontal fashion and extending it to a position directly beneath the aforementioned second point;

measuring the distance from the position of the tool at the first point to the aforementioned position beneath said second point;

visually sighting from said tool along said protractor to said second point, so as to ascertain the angle of inclination thereof; and retrieving the distance information from point 1 to point 2 by use of the information achieved through operation of the combination tool hereabove.

2. The method of claim 1, wherein the step of sighting the angle of inclination from said first point to said second point along the protractor of said combination tool is modified when said combination tool is not horizontally disposed by subtracting from the reading taken on the protractor of the tool the amount of angular inclination pre-existing at the time the siting is taken.

3. The method of claim 1, wherein the tool is magnetically affixed to a surface at the said first point or is otherwise affixed when it is positioned thereat, so as to facilitate removal of the retractable tape measure by a single user.

4. The steps of claim 2, wherein a structural bridge is fabricated to the length corresponding between point 1 and point 2 and thereafter is physically installed.

* * * * *